United States Patent
Caspary et al.

[15] 3,672,212
[45] June 27, 1972

[54] DEVICE FOR THE MEASUREMENT OF THE ANGLE OF ROTATION OF A ROTATABLE OBJECT

[72] Inventors: Rudolf Caspary, Hanau am Main; Peter Kretschmer, Niederrodenbach, both of Germany

[73] Assignee: Dunlop Holdings Limited, London, England

[22] Filed: March 27, 1970

[21] Appl. No.: 23,398

[30] Foreign Application Priority Data

March 31, 1969 Germany ............... P 19 16 525.4

[52] U.S. Cl. .................................. 73/99, 338/137
[51] Int. Cl. .................................................. G01h 3/26
[58] Field of Search ............... 73/99, 136 A, 398 AR; 33/1 N, 33/1 PT; 338/89, 137, 171

[56] References Cited

UNITED STATES PATENTS

| | | |
|---|---|---|
| 2,396,244 | 3/1946 | Borsum ........................... 338/137 X |
| 2,743,408 | 4/1956 | Schmitt ........................... 338/137 X |
| 2,856,769 | 10/1958 | Bennett et al. ........................ 73/99 |

FOREIGN PATENTS OR APPLICATIONS 385,792　11/1923　Germany ........................... 73/136 A Primary Examiner—Charles A. Ruehl
Attorney—Stevens, Davis, Miller & Mosher

[57] ABSTRACT

A device for the accurate measurement, despite misalignment of parts, of the angle of rotation or twist of an object capable of being rotated or twisted e.g. a test-piece in a torsion-testing apparatus. The device incorporates opposed contacts normally held free of an associated annular resistor or resistors, the contacts being connected to a summing circuit which compensates for errors arising from the angular measurement of voltage to arrive at the angle of rotation or twist.

12 Claims, 7 Drawing Figures

DEVICE FOR THE MEASUREMENT OF THE ANGLE OF ROTATION OF A ROTATABLE OBJECT

This invention concerns a device for the measurement of the angle of rotation of an object which is capable of being rotated or twisted with a potentiometer, fed from a fixed voltage source, whose movable part is coupled to the object and which supplies an output voltage proportional to the angle.

In known methods of angular measurement, potentiometers with sliding pick-offs, as well as inductive, capacitive or photoelectric measuring systems are employed. The known measuring systems suffer the disadvantage, however, that the moving parts must be positively supported, free from lost motion, since the output signal is markedly dependent on the position of the moving system. In addition to this, the support must be so arranged that only rotational movement is possible, completely excluding all translatory movements of the measuring system, particularly at right angles to its axis of rotation.

Because of friction at the supports with known methods of measurement, a certain torque needs to be applied in order to obtain a reading, so that errors of measurement are unavoidable. In order to avoid the disadvantages quoted, considerable outlay in electronics or optical means has been necessary hitherto. Recourse had to be made to e.g. carrier frequency test amplifiers, lenses, prisms and the like.

The object of the invention is to provide a device of the kind mentioned above, with which extremely accurate measurement is possible, even in the case of imperfect alignment of the rotational axis of the potentiometer and of the rotating object, and even when the torque available for operation is only small.

In accordance with the invention there is provided a device for the measurement of the angle of rotation or twist of an object capable of being rotated or twisted comprising a potentiometer connectable to a constant voltage source, said potentiometer comprising an annular resistor and two contacts for picking up voltages from the resistor, which voltages are dependent on the angle of rotation or twist of the object, the contacts being for mechanical connection to the object, electrically insulated from and mechanically connected to each other, moveable in a direction axially of the resistor into or out of electrical contact therewith, being at substantially diametrically opposed locations of the resistor when in electrical contact therewith, and electrically connected to a summing circuit which compensates for errors in the angular measurement picked up by the contact at substantially diametrically opposite locations on the resistor and provides a voltage output indicating the angle of rotation or twist of the object.

The contacts are thus not in electrical contact with the resistor while the object is rotating, thereby avoiding any torque resisting the rotation or twist of the object. Preferably reciprocatable means e.g. at least one electro-magnetic solenoid, is provided for moving the contacts axially with respect to the resistor, i.e. for raising or lowering the contacts when the axis of the resistor is vertical.

An accurate reading is made possible by means of this invention since no resistance whatever is offered to the rotation of the object by the measuring device itself. The test results are read off only when the contacts make electrical contact with the resistor after a particular angle of rotation to be measured has been reached. Thus, in accordance with the invention, the rotatable object need not be supported.

In addition to this, it is not deleterious with the system of measurement in accordance with the invention, if the axis of rotation of the rotatable object and of the potentiometer formed by the annular resistor and the contacts associated with this latter, are displaced relative to each other.

Preferably the summing circuit not only forms the sum of the voltages picked up by each contact but also subtracts the voltage corresponding to an angle of rotation or twist of 180° and divides by two. The result is angle $\alpha$, the angular error $\Delta\alpha$, involved due to possible displacement of the axes, having been eliminated.

Difficulties can arise during operation of the device when a contact, between two successive measurements, moves across the end of the annular resistor and the contact voltage changes abruptly from O to +E (the voltage of the source feeding the potentiometer) or vice-versa. Thus a preferred form of the device comprises a changeover means for changing the operation of the summing circuit, to operate according to one mathematical function over one annular range e.g. 180° of the annular resistor and according to another function over another range e.g. the remaining 180° of the resistor. The operation of the changeover means to change the operation of the summing circuit depends on the difference between the voltages picked up by the two contacts, and in one form of the invention operates when the difference changes from a positive to a negative value or vice-versa.

A preferred form of the invention provides that the annular resistor has a fixed central tapping and that an output voltage $E_A = -E_1 + \frac{1}{2}(U_A - U_B)$ is formed with either positive or negative difference $(U_A - U_B)$ and an output voltage $E_A = -E + \frac{1}{2}(U_A + U_B)$ is formed when the difference $(U_A - U_B)$ is of the opposite sign to that referred to above i.e. either negative or positive respectively, where $E_1$ is one half of the total voltage (E) applied to the annular resistor and $U_A$, $U_B$ are the voltages at the contacts A and B. Angles from −90° to +90° and from +270° to +360° etc. are measured in accordance with the first equation, while the second equation permits the measurement of angles between +90° and 270° etc.

In one form of the device according to the invention, two annular resistors, arranged one above the other, are provided, one contact co-operating with one of the annular resistors and the other contact with the other resistor.

The ends of the annular resistor or resistors preferably have a small separation, of the order of size of 0.2mm to 0.4mm.

In order to obtain an automatic changeover for the different ranges of angle mentioned above, a comparator can be provided which supplies a signal, dependent upon the sign of the difference $U_A - U_B$, operating a relay for the changeover to the voltage $E$ or $E_1$. The contact voltages $U_A$, $U_B$ are preferably supplied to a difference-forming circuit, to which, in addition, the fixed voltage selected by the comparator is also supplied. An amplifying transistor can preferably be connected in circuit between the relay and the comparator.

The device of the invention can preferably be applied to the measurement of torsion or twist. In this case, for example, a test-piece, clamped fast at one end can be connected by its other end to a steel wire which is capable of being twisted so as to impart a specified torque. In accordance with the invention, the contacts are situated at the location of the connection between test piece and wire, with this method of measurement.

Embodiments of the invention will now be described by way of example with reference to the accompanying drawings in which.

Figure 1:
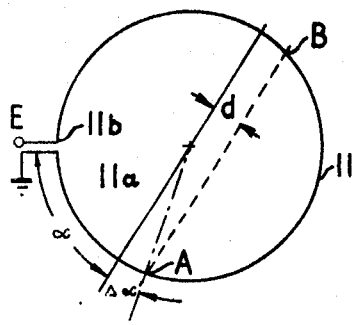
FIG. 1 shows a diagrammatic plan view of a device in accordance with a first embodiment of the invention.

As shown in FIG. 1, the measuring device in accordance with the first embodiment comprises an annular resistor 11, whose opposite-facing ends 11a, 11b are separated by only a small distance of 0.2mm to 0.4mm. Swinging freely above the annular resistor are disposed two spring contacts A and B, which are mechanically connected to the object whose rotation is to be measured. These contacts and the annular resistor together form an annular potentiometer. The contacts A, B can be lowered onto the annular resistor or lifted from it by means of electromagnets or by some other release mechanism which is not illustrated.

The two contacts A and B are spaced at 180° with respect to the annular resistor, and rigidly connected to and electrically insulated from each other. When the electrical zero position in accordance with FIG. 1 coincides with an angle of rotation of 0°, there thus arises a voltage at the contact A which is proportional to the angle of rotation $\alpha$, on contact with the annular resistor, while a voltage proportional to the angle $180° + \alpha$ can be picked up from the contact B, when the contacts are applied to the annular resistor.

If the rotational movement of the two contacts about the axis lying perpendicular to the plane of the annular resistor now has a translational movement at right angles to this axis superimposed upon it, due to a disturbance of any kind whatever, then as shown on FIG. 1, there occurs a displacement d of the contacts from the central position. Due to this error, the contact A now supplies a voltage proportional to $\alpha + \Delta\alpha$, while a voltage proportional to $180° + \alpha - \Delta\alpha$ appears at the contact B, $\Delta\alpha$ being the apparent angular error corresponding to the displacement d in this case.

In order now to obtain the actual angle $\alpha$ to be measured, the voltages appearing at the contacts A and B are first supplied to a summing circuit, which carries out the following addition:

$$180 + \alpha - \Delta\alpha + \alpha + \Delta\alpha = 180 + 2\alpha.$$

As is apparent, the error $\Delta\alpha$ is eliminated in the summation. The correct angle $\alpha$ can be obtained directly by subtraction of the voltage value corresponding to 180° and division of the result by 2. The test instrument in accordance with the invention thus permits a voltage directly proportional to the correct angle of rotation $\alpha$ to be obtained, independent of displacement of the contacts parallel to the plane of the annular resistor.

If the displacement between the annular resistor and the contacts A and B associated with it, is in the direction of the line connecting the two contacts, then, as is apparent, no angular error $\Delta\alpha$ arises. As is obvious the contacts A and B must be sufficiently long along the direction of the line connecting them, such that they can still come into contact reliably with the annular resistor 11, when they are lowered onto this latter, even when the largest displacement error occurs in the direction of the line connecting them. The measuring device in accordance with the invention thus compensates automatically for errors of displacement between the rotational axis and the axis of the annulus, independent of the direction perpendicular to the axis of the annulus, along which the displacement occurs.

Figure 2:
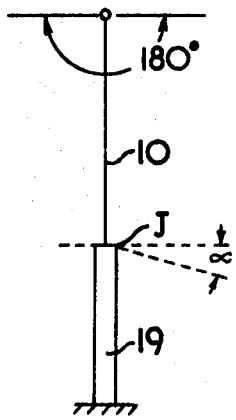
FIG. 2 shows a diagrammatic side view of a known method of torsional measurement, in which the device in accordance with the invention can be utilized.

The method of measurement in accordance with the invention can be employed with advantage in all cases of the electrical representation of the angle of twist or rotation, where means of support must be dispensed with, but, on the other hand, an accurately centralized position of the pick-off system cannot be guaranteed. For example, the method can be employed with automatic equipment for the measurement of the torsional modulus, substantially in accordance with ASTM D 1053. This test method is represented diagrammatically in FIG. 2, wherein a test-piece 19, whose torsional modulus is to be determined from its angular deflection under a specified torque, is fixed at its lower end, while a steel wire 10 is secured to its upper end. The steel wire is turned through 180° at its upper end. This rotation is distributed, partly in the steel wire, partly in the test-piece. The angle of twist $\alpha$ at the location of the connection J between wire and test-piece is the value to be measured.

For this purpose the spring contacts A and B of the annular potentiometer are secured to the location of the connection between wire and test-piece. Measurement of the angle $\alpha$ can then be carried out with the aid of electronic calculating means, as has been described with the aid of FIG. 1.

Figure 3:
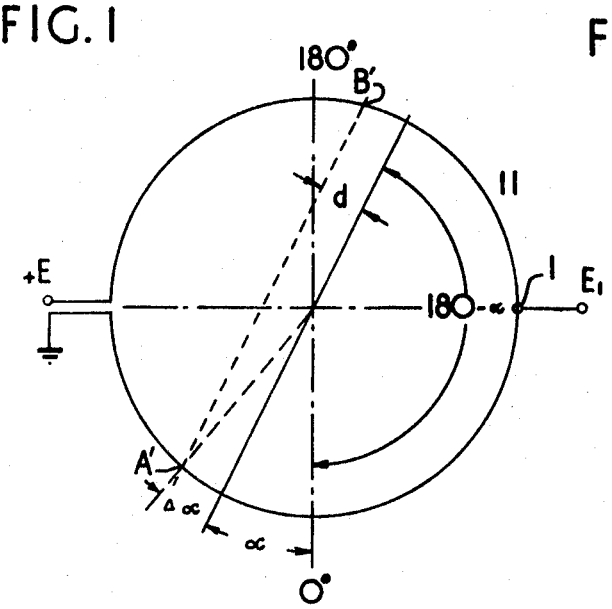
FIG. 3 shows a diagrammatic plan view of a device in accordance with a second embodiment of the invention, where an additional fixed central tapping is provided.

To avoid difficulties which can arise with the changeover of one contact from one end of the potentiometer to the other, in which changeover the contact voltage changes abruptly from O to +E or vice versa, measurement can also be effected with the aid of a device according to a second embodiment of the invention shown in FIG. 3, with which it is also possible to cover angles between −90° and +360°. For this purpose, the annular resistor 11 has a further, fixed, central tapping 1, as shown in FIG. 3, in addition to the construction as shown in FIG. 1. This tapping is situated diametrically opposite the ends of the annular resistor.

An additional difference in the construction as shown in FIG. 3, compared with that of FIG. 1, consists in that the mechanical zero position is displaced by 90° relative to the electrical zero-position, which is indicated by the earth symbol. It is now assumed that the object carrying the contacts A and B twists through an angle $\alpha$, lying between 0 and −90°. In addition, a displacement of the axis of magnitude d is present. Let the total voltage at the annular resistor be E, as in the example of FIG. 1, so that the voltage at the pick-off 1 amounts to $E_1$ (equal to E/2). By means of a further computing device, described below, an output voltage $E_A$ is obtained for angles between −90° and +90° and also +270° and 360° the composition of which is as follows:

$$E_A = -E_1 + \tfrac{1}{2}(U_A + U_B) \quad (2)$$

Substituting for +E $$+E = C.360 \quad (3)$$

where C is a constant, it then follows that $$E_1 = C.180° \quad (4)$$

In terms of the constant C, the following values result for the voltages $U_A$ and $U_B$ $$U_A = C.(90 - \alpha - \Delta\alpha) \quad (5)$$
$$U_B = C.(270 - \alpha + \Delta\alpha) \quad (6)$$

the output voltage $E_A$ is then calculated as follows $$E_A = -C.180 + \tfrac{1}{2}C(90 - \alpha - \Delta\alpha + 270 - \alpha + \Delta\alpha) \quad (7)$$
$$E_A = -C.180 + C/2(360 - 2\alpha) \quad (8)$$
$$E_A = -C.180 + C.180 - C\alpha \quad (9)$$
$$E_A = -C\alpha \quad (10)$$

The output voltage of the computer, which can calculate the function (2) is thus proportional to the angle $\alpha$, as is desired. The angular error $\Delta\alpha$ due to the displacement error d, is eliminated.

For the calculation of angles between +90° and 270° an input voltage $-E$ ($=-2E_1$) is supplied to the computer instead of the input voltage $-E_1$ as in Equation (2). The operation carried out by the computer is then as follows:

$$E_A = -E + \tfrac{1}{2}(U_A + U_B) \quad (11)$$

and making use of equation (3), the result of this computation is $$E_A = -C.(180 + \alpha) \quad (12)$$

It can be seen that this result, too, is directly dependent on the angle of twist $\alpha$, the angular error $\Delta\alpha$ having been eliminated.

The changeover of the computer from the function (2) to the function (11) can be effected by hand or automatically.

Figure 4:
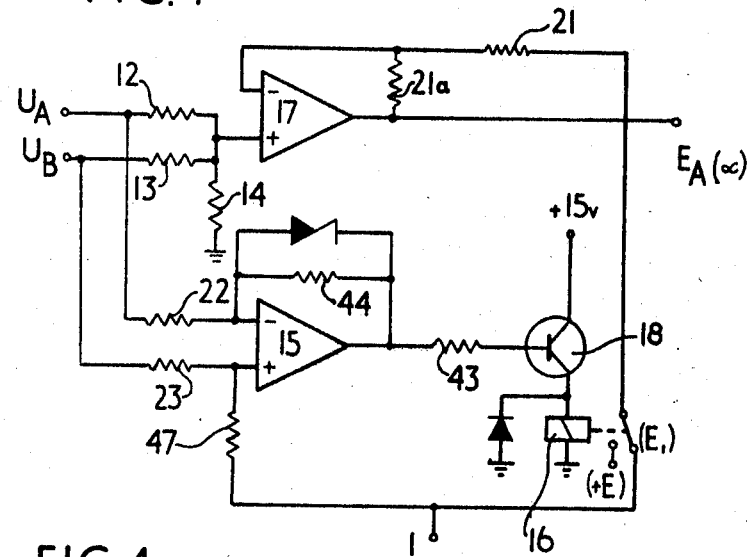
FIG. 4 shows an electrical circuit which permits the calculation of the angle of rotation or twist $\alpha$ and makes possible the automatic changeover of the range of angular measurement.

FIG. 4 shows the circuit of a computer which is capable of carrying out the operation resulting in function (2) and in function (11), and which, in addition can carry out the changeover from one function to the other automatically.

The voltages $U_A$ and $U_B$, taken from the contacts A and B are applied to a computer 17 by way of resistors 12 and 13. A suitable leakage resistor 14 provides for a signal to be available at the input of the computer, which corresponds to the arithmetic mean of the input voltages $U_A$ and $U_B$. Supplied to a second input of the computer across a further resistor 21 is the voltage E or $E_1$, according to the position taken up by the contacts of a relay 16. In the diagram shown in FIG. 4, the fixed tapping 1, which carries the voltage $E_1$ is connected to the second input of the computer 17. The computer 17 carries out the subtraction of the two input signals, so that the desired voltage $E_A$, which is proportional to angle $\alpha$, is present at the output.

The two input voltages $U_A$, $U_B$ are, in addition, supplied through resistors (22, 23) to the inputs of a comparator 15, which supplies an output signal dependent on the sign of the difference ($U_A - U_B$). The output signal of the comparator is supplied through further resistor to the input of an amplifying transistor 18, in whose output circuit the relay 16 is included.

In the illustrated position of relay 16, the transistor 18 carries no current and the contact is connected to the voltage $E_1$. If now the sign of the difference $U_A - U_B$ changes, then there appears a gating signal at the base of the transistor 18, so that the relay 16 pulls in and connects the switch blade with the voltage +E.

As appears from FIG. 3, the sign of the difference $U_A - U_B$ alters whenever one of the contacts A', B' changes over from the end position of the annular resistor 11 to the electrical zero position. The entire 360° region can be covered by means of the automatic switching described.

The measuring system in accordance with the invention is characterized by simplicity and robustness. In addition to insensitivity to displacement of the axis of the contacts it is also largely independent of vertical displacements and tilting of the mounting for the contacts.

The annular resistor 11 can be a simple resistance wire, a wound resistance wire, a semiconductor or the like.

Figure 4A:
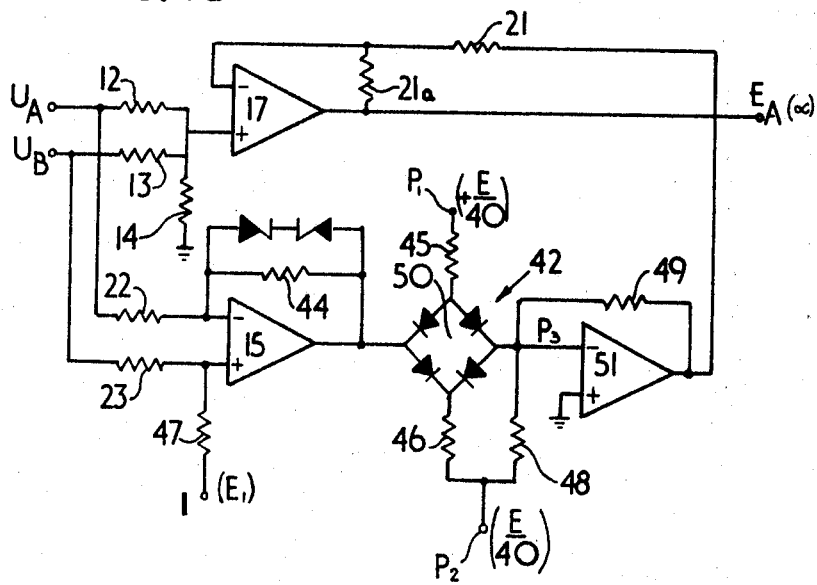
FIG. 4a shows a modification of this circuit.

In place of the relay 16, shown in FIG. 4, a limiting device 42, connected in circuit after the comparator 15 can also be employed, as shown in FIG. 4a, supplying the desired potential according to the sign of the comparator output voltage. This device 42 comprises a rectifier bridge 50 to which two input potentials $P_1$ and $P_2$ each equal to E/40 are applied via associated resistors 45, 46 and 48. Depending on the output from the comparator 15, the current through the bridge 50 is varied so that the input potential $P_3$ to an amplifier 51 having a feed back circuit containing resistor 49 is also varied. The output from the amplifier 51 is thus changed from $E_1$ to E or vice-versa depending on the relative values of $U_A$ and $U_B$.

The relative values of the resistors in the circuits shown in FIGS. 4 and 4a are preferably as follows:

| Reference Numeral | Relative Value |
| --- | --- |
| 12 | R |
| 13 | R |
| 14 | 0.5 R |
| 21 | R |
| 21a | R |
| 22 | R |
| 23 | R |
| 43 | 0.05 R |
| 44 | 10 R |
| 45 | 10 R |
| 46 | 10 R |
| 47 | 10 R |
| 48 | 3.33 R |
| 49 | 100 R |

It should be noted that the output voltage range of the computer can be varied in a simple manner by changing the values of the resistors 12, 13, 14, 21, 21a, so that adaptation to test equipment, or an increase of the range of measurement can be carried out without complication.

Figure 5:
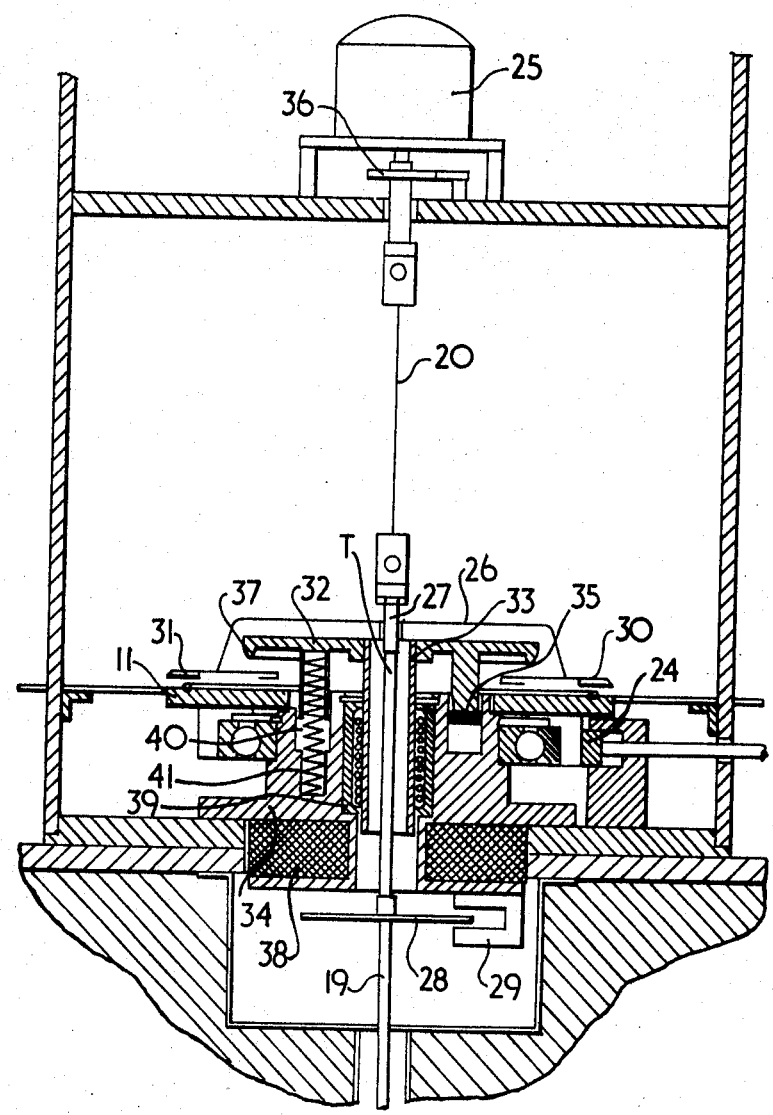
FIG. 5 shows an axial section of a preferred form of torsion meter constructed to have an angle measuring device in accordance with the invention.

In order to make the test method in accordance with the invention for the determination of the torsional modulus capable of being carried out automatically, a frictionless data recorder as shown in FIG. 5 can be used, which embodies the annular potentiometer 11, rotatably supported and capable of being fixed in position with the aid of a clamping arrangement 24. The twisting of the torsion wire 20 through 180° is carried out by a motor 25. A pointer 26, swinging above the annular potentiometer 11, and connected to the lower clamp 27 for the torsion wire, deflects through an angle of twist $\alpha$, in accordance with the stiffness of the test-piece T.

An aluminum disc 28, situated, in accordance with the invention, in the magnetic field of a permanent magnet 29, acts as an eddy current brake and brings the instrument linkage, set in vibration by the rotation, to rest more quickly.

The contacts 30 and 31 are electrically insulated from each other and secured to the pointer 26 which is constructed to allow the contacts to spring in a vertical direction but to prevent relative sideways movement.

A lowering ring 32, formed internally with a steel tube 33, is supported away from the main body 34 of the apparatus on three compression springs 41 situated in the damping chamber 40. The ring is constructed so as to act as an air damper with the main body 34, a sealing ring 35 being provided to ensure optimum damping. By means of this damper the knife-shaped contacts 30 and 31 can be lowered gently onto the annular potentiometer 11. Thus, a voltage corresponding to the angle of twist $\alpha_1$ can be supplied to the electronic computer through the contact 30, the pointer 26, the clamp 27, the torsion wire 20 and spiral spring 36. The voltage corresponding to the angle of twist $\alpha_2$ is likewise supplied to the electronic computer by means of contact 31, through a contact ring 37, inserted in the lowering ring 32. The electronic computer then forms the arithmetic mean of the two values and from it, calculates a logarithm of the torsional modulus.

About 10 seconds after rotation of the wire 20 has been carried out, a current is caused to flow through the windings of an electromagnet 38, situated beneath the main body 34, whereupon the steel tube 33, guided in a gall-bearing bush 39, is drawn into the magnetic field of the coil against the resistance set up by the air damper and the compression springs. With this the contacts 30, 31 are lowered gently onto the annular potentiometer and measurement can take place.

After the torsional modulus has been recorded, the current flowing through the magnet windings 38 is again switched off and the lowering ring 32 then returns to its rest position under the influence of the three compression springs 41. The motor 25 turns the torsion wire 20 back to its initial 0° setting so a new measurement can begin.

Figure 6:
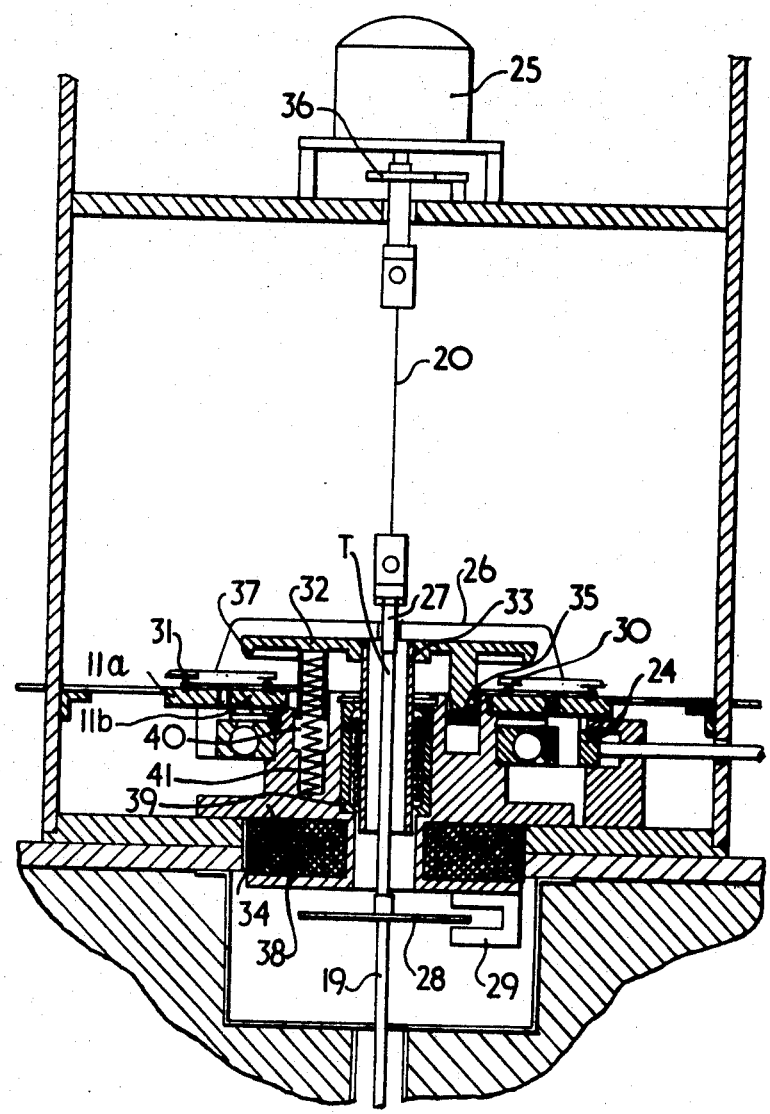
FIG. 6 shows an alternative form of the meter shown in FIG. 5.

The particularly preferred form of device shown in FIG. 5 has the advantage that a compact and space-saving construction is obtained due to the coaxial arrangement of all the components. The device nevertheless functions very dependably and reliably. An alternative form of the device is illustrated in FIG. 6, differs from the device illustrated in FIG. 5 in that the single annular resistor 11 is replaced by two concentric annual resistors 11a and 11b. One contact 30 picks off a voltage from one resistor 11a while the other contact 31 picks off a voltage from the other resistor 31. In other respects the device is similar to that illustrated in FIG. 5.

Having now described our invention, what we claim is:

1. A device for the measurement of the angle of rotation or twist of an object capable of being rotated or twisted comprising a potentiometer connectable to a constant voltage source, said potentiometer comprising annular resistor means and two contacts for picking up voltages from the resistor means, which voltages are dependent on the angle of rotation or twist of the object, the contacts being for mechanical connection to the object, electrically insulated from and mechanically connected to each other, moveable in a direction axially of the resistor means into or out of electrical contact therewith, being at substantially diametrically opposed locations of the resistor means when in electrical contact therewith, and electrically connected to a summing circuit which is capable of providing a voltage output indicative of the angle of rotation or twist of the object and of compensating for errors in the angular measurement due to the displacement of the axis of rotation or twist from the axis of the annular resistor, said displacement being translated into voltage errors to be picked up by the contacts at substantially diametrically opposite locations on the resistor.

2. a device according to claim 1 wherein the summing circuit operates to compensate for the said errors by forming one-half the sum of the two voltages picked up by the contacts, and subtracting the voltage value corresponding to an angle of rotation or twist of 180°.

3. A device according to claim 1 comprising changeover means for changing the operation of the summing circuit to operate according to one mathematical function over one angular range of the annular resistor and to another function over another angular range of the resistor.

4. A device according to claim 3 wherein the changeover means operates to change the operation of the summing circuit when the difference between the two voltages picked up by the contacts changes from a positive to a negative value or vice-versa.

5. A device according to claim 4 wherein the annual resistor has a fixed central tapping where the resistor is divided into two parts each having an equal resistance value and a first output voltage $E_A = -E_1 + \frac{1}{2}(U_A + U_B)$ is formed by the summing circuit when the input voltages to said summing circuit are $U_A$, $U_B$, and $-E_1$ for a positive or negative difference $(U_A - U_B)$ and a second output voltage $E_A = -E + \frac{1}{2}(U_A + U_B)$ is formed by the summing circuit when the input voltages to said summing circuit are $U_A$, $U_B$ and $-E$ for a difference $(U_A - U_B)$ of sign opposite to that for the formation of the first output voltage, $E_1$ being the voltage tapped off from the said fixed central tapping and therefore being equal to one half of the total voltage E applied to the annular resistor and $U_A$ and $U_B$ are the voltages picked up by the two contacts.

6. A device according to claim 5 wherein said changeover means comprises a comparator which supplies a signal dependent on the sign of the voltage difference $(U_A - U_B)$ and a relay, operable by the said signal for switching over the input voltage to the summing circuit from $-E_1$ to $-E$ or vice-versa.

7. A device according to claim 1 wherein the annular resistor means is two coaxial annular resistors, one contact being moveable into contact with one annular resistor, the other contact into or out of contact with the other annular resistor, the two contacts picking up voltage one from each annular resistor.

8. A device according to claim 1 wherein the means for moving the contacts axially of the resistor into or out of electrical contact therewith comprises at least one electromagnetic solenoid.

9. A device according to claim 1 wherein the ends of the annular resistor are separated.

10. A device according to claim 1 wherein the axis of the annular resistor is substantially vertical.

11. Torsion measuring apparatus incorporating a device for the measurement of the angle of rotation or twist of an object according to claim 1.

12. Torsion measuring apparatus incorporating a device for measuring the angle of twist of a test-piece according to claim 1, a steel wire which on twisting one of its ends through a specified angle imparts a specific torque to the test-piece clamped securely at one end and connected at its other end to the other end of the wire, the two contacts being connected to the junction of the test-piece and the wire.

* * * * *